Patented Sept. 18, 1951

2,568,620

UNITED STATES PATENT OFFICE 2,568,620

SUBSTITUTED TRIAZINES

Thomas L. Gresham and Thomas R. Steadman, Akron, Ohio, assignors to The B. F. Goodrich Company, New York, N. Y., a corporation of New York No Drawing. Application September 8, 1948,
Serial No. 48,320

2 Claims. (Cl. 260—248)

This invention relates to novel heterocyclic compounds and pertains more particularly to the preparation of substituted triazines by an acid catalyzed reaction of formaldehyde with acrylonitrile or an alpha-substituted acrylonitrile.

It is known that when acrylonitrile is reacted with formaldehyde in aqueous solution and in the presence of an alkaline condensing agent such as sodium hydroxide there is obtained the hemiformal or the formal of ethylene cyanohydrin, depending on the formaldehyde-acrylonitrile molar ratio.

We have now discovered that when formaldehyde and acrylonitrile (or an alpha-substituted acrylonitrile) are brought together in the presence of a catalytic amount of an organic or inorganic acid, reaction occurs to produce novel heterocyclic compounds of the general formula

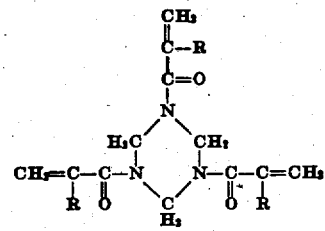

wherein R may be hydrogen, alkyl, aryl, or aralkyl, depending on the particular nitrile which is used. These novel compounds as a class are correctly named hexahydro - 1,3,5-tris-acyl-s-triazines. Thus, for example, the compound obtained from formaldehyde and acrylonitrile (i. e., when R is hydrogen) may be named hexahydro-1,3,5-tris-acrlyl-s-triazine. The compounds having the unusual structure shown above, as well as the saturated compounds resulting when the above compounds are hydrogenated by any of the usual methods of hydrogenation, have not been prepared heretofore, and are useful for a number of purposes.

The saturated derivatives of the above compounds possess the general formula

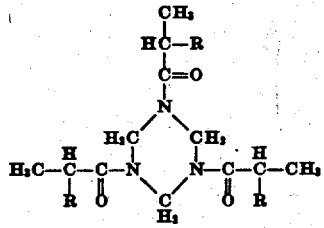

wherein R has the same meaning as above, and are also members of the general class of hexahydro-1,3,5-tris-acyl triazines. For example, the compound resulting when R is hydrogen is named hexahydro-1,3,5-tris-propionyl-s-triazine.

The highly unusual reaction whereby the unsaturated hexahydro-1,3,5-tris-acyl-triazines are obtained may be represented by the following equation:

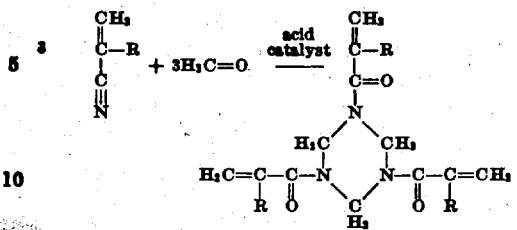

As has been disclosed hereinabove, either acrylonitrile or any alpha-substituted acrylonitrile of the general formula

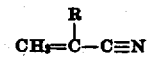

wherein R is a member of the class consisting of hydrogen, alkyl, aryl or aralkyl substituents reacts with formaldehyde in accordance with the invention. Acrylonitrile itself and the alpha-alkyl substituted acrylonitriles such as alpha-methyl acrylonitrile, alpha-ethyl acrylonitrile, alpha-propyl acrylonitrile, alpha-butyl acrylonitrile and the like form a preferred class of acrylonitriles for use in the reaction although alpha-aryl substituted acrylonitriles such as alpha-phenyl acrylonitrile, alpha-tolyl acrylonitrile, and the like, as well as alpha-aralkyl substituted acrylonitries such as alpha-benzyl acrylonitrile, alpha-phenylhexyl acrylonitrile and the like may also be used advantageously.

It is desirable that the formaldehyde which reacts with acrylonitrile be substantially anhydrous. Accordingly, the formaldehyde is preferably obtained from trioxane, polyoxymethylene or other substance which produces formaldehyde in the presence of an acid or when heated.

The formaldehyde and acrylonitrile are preferably brought together in equimolecular proportions (the amount theoretically required for the reaction) although other ratios, including an excess of either reactant may also be employed.

The acid which is utilized in the reaction serves both to catalyze the formation of the triazine ring and to react with trioxane or other formaldehyde producing substance to form the formaldehyde which is utilized in the reaction. Any inorganic or organic acid such as concentrated sulfuric acid, hydrochloric acid, phosphoric acid, acetic acid, propionic acid, butyric acid and the like is operative. The acid is preferably employed in catalytic amounts of from 1% to 10% although smaller or larger amounts may be used if desired.

The reaction of formaldehyde with acrylonitrile in accordance with this invention is carried out simply by bringing the reactants into efficient contact and adding the acid. Although the reaction will proceed slowly at room temperature or even lower it is desirable that the reaction mixture be brought to reflux temperature, temperatures of from 50° C. to 125° C. generally being suitable for this purpose. As the refluxing proceeds the reaction is exothermic and it is necessary to provide external cooling means, especially when the materials are reacted in large quantities. When the reaction is complete, which in most cases requires about 1 hour, the reaction mixture is cooled and at this point the product is obtained as a solid which may be separated from unreacted liquid, if any, by filtering. A product of higher purity is obtained, however, by first neutralizing the catalyst by the addition of aqueous alkali whereupon the solid product disperses, forming an alkaline suspension from which the product may be obtained in substantially pure form simply by filtering. Alternatively, the reactants may be brought together in the presence of an inert solvent or diluent, for example, acetic acid, it being desirable that such solvent or diluent have a boiling point sufficiently high to allow the reaction to be conducted at the reflux temperature of the nitrile without appreciable loss of solvent or diluent through vaporization. It is to be understood that the particular manner in which the reaction is conducted is not critical and any conventional procedure may be adopted.

The saturated compounds of this invention are prepared by hydrogenating the unsaturated compounds prepared in the manner disclosed hereinabove by any of the known methods of hydrogenation. For example, one method consists in placing an alcohol solution of the unsaturated compound and a platinum oxide hydrogenation catalyst in a hydrogen absorption apparatus and introducing hydrogen into the solution whereupon the saturated compound is obtained from the alcoholic solution.

The preparation of both the saturated and the unsaturated compounds will be described in greater detail in the following specific examples wherein all parts are by weight. The examples are not to be construed as a limitation on the scope of the invention, however, for there are, of course, numerous possible variations and modifications.

Example I

A solution of 30 parts (equivalent to one mole formaldehyde) of trioxane in 54 parts (one mole) of acrylonitrile is placed in a glass reactor equipped with a reflux condenser and a stirrer. The solution is cooled to 15° C. with a water bath and 5.5 parts of concentrated sulfuric acid are added dropwise. The water bath is heated to a temperature so that the reaction mixture begins to reflux. The temperature of the reaction mixture slowly rises to 92° C., at which point the reaction mixture is surrounded by an ice bath to eliminate the excess heat of the exothermic reaction. When the reaction mixture cools to 80° C. a solution of 4.3 parts of sodium hydroxide in 300 parts of water is added. The solid product which has formed in the reaction mixture disperses readily in this medium, forming an alkaline suspension. Upon filtering and drying of the product 34.5 parts (40.5%) of hexahydro-1,3,5-tris-acrylyl-s-triazine are obtained.
Analysis:

Calculated for
$C_{12}H_{15}N_3O_3$:
Carbon_____ 57.81%
Hydrogen_____ 6.07%
Molecular weight_____ 249.2

Found:
Carbon_____ 57.68%, 57.74%
Hydrogen_____ 6.08%, 6.02%
Molecular weight_ 251, 252

Example II 1.5 parts of the compound prepared in Example I together with 12 parts of ethanol and .005 part of a platinum oxide hydrogenation catalyst (Adam's catalyst) are placed in a hydrogen absorption apparatus and hydrogen is introduced into the solution for 93 minutes at 30° C. From the alcoholic solution are obtained 1.3 parts (84.6%) of hexahydro-1,3,5-tris-propionyl-s-triazine. (M. P. 169°–170° C.)
Analysis:

Calculated for
$C_{12}H_{21}N_3O_3$:
Carbon_____ 56.45%
Hydrogen_____ 8.29%
Molecular weight_____ 255.3

Found:
Carbon_____ 56.55%, 56.53%
Hydrogen_____ 8.21%, 8.28%
Molecular weight_ 265, 261

Example III

To a well stirred solution of 30 parts of trioxane in 67 parts (one mole) of alpha-methyl acrylonitrile are added 5.5 parts of concentrated sulfuric acid. The temperature of the reaction rises slowly due to an exothermic reaction. The mixture is warmed slowly over a period of one hour to a temperature of 110° C. and then cooled to 50° C. A solution of 4.3 parts of sodium hydroxide dissolved in 250 parts of water are added to the reaction mixture whereupon an oily phase forms, which slowly solidifies to a crystalline material. After separation of the solid crystals, and two recrystallizations from chloroform there are obtained 40 parts (41.3%) of hexahydro-1,3,5-tris-methacrylyl-s-triazine. (M. P. 150°–151° C.)
Analysis:

Calculated for
$C_{15}H_{21}N_3O_3$:
Carbon_____ 61.83%
Hydrogen_____ 7.27%
Nitrogen_____ 14.42%
Molecular weight_____ 291.3

Found:
Carbon_____ 61.83%, 61.80%
Hydrogen_____ 7.24%, 7.38%
Nitrogen_____ 14.41%, 14.47%
Molecular weight_ 292

Example IV 2 parts of the compound obtained in Example III are placed in ethanol solution together with .005 part of a platinum oxide hydrogenation catalyst and the solution then placed in a hydrogen absorption apparatus. Hydrogen is introduced into the solution for 90 minutes at 30° C. From the alcoholic solution are obtained 1.5 parts (75%) of hexahydro-1,3,5-tris-isobutyryl-si-triazine. (M. P. 145°–149° C.)
Analysis:

Calculated for
$C_{15}H_{27}N_3O_3$:
Carbon_____ 60.58%
Hydrogen_____ 9.15%
Nitrogen_____ 14.13%

Found:
Carbon_____ 60.81%, 60.82%
Hydrogen_____ 9.28%, 9.15%
Nitrogen_____ 14.04%, 14.05%

When the above examples are repeated using alpha-phenyl acrylonitrile in place of acrylonitrile itself or alpha-methyl acrylonitrile, hexahydro-1,3,5-hydratropyl-s-triazine is obtained and upon hydrogenation of this product, the saturated derivative is formed. Similar results are obtained when other alpha-substituted acrylonitriles of the formula

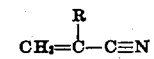

wherein R is a member of the class consisting of hydrogen, alkyl, aryl, and aralkyl are utilized in the reaction with formaldehyde.

The unsaturated compounds of this invention polymerize readily on heating, preferably in the presence of peroxide catalysts, to white, infusible materials which are useful for many purposes. The unsaturated compounds are also useful as stabilizers for vinyl resins and as crossbonding agents in thermosetting resin compositions. The saturated derivatives tend to be more stable than the unsaturated compounds and have many valuable uses. For example, they may be used as insecticides, fungicides, as chemical intermediates and for numerous other uses.

Although specific embodiments of the invention have been herein described, it is not intended to limit the invention thereto, but only to the spirit and scope of the appended claims.

We claim:

1. The method of preparing a heterocyclic compound of the formula

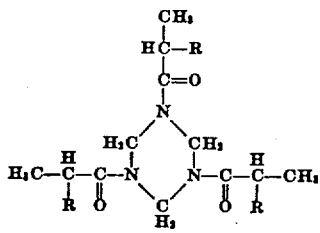

wherein R is a member of the class consisting of hydrogen, alkyl, aryl and aralkyl, which comprises reacting a formaldehyde supplying compound with a compound of the formula

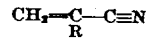

wherein R is a member of the class consisting of hydrogen, alkyl, aryl and aralkyl, in the presence of an acid catalyst, and treating an alcohol solution of the thus produced product with hydrogen in the presence of a platinum oxide hydrogenation catalyst.

2. The method of preparing hexahydro-1,3,5-tris-propionyl-s-triazine which comprises reacting a formaldehyde supplying compound with acrylonitrile in the presence of an acid catalyst and at a temperature of from 50° C. to 125° C. and treating an alcohol solution of the thus produced product with hydrogen in the presence of a platinum oxide hydrogenation catalyst.

THOMAS L. GRESHAM.
THOMAS R. STEADMAN.

No references cited.

Certificate of Correction

Patent No. 2,568,620                                                    September 18, 1951

THOMAS L. GRESHAM ET AL.

It is hereby certified that error appears in the printed specification of the above numbered patent requiring correction as follows:

Column 2, lines 4 and 5, for $\underline{\text{acid catalyst}}$ read $\underline{\text{acid catalyst}}{\longrightarrow}$ column 3, line 75, for "361" read *261*; column 4, line 49, for "—si—" read —*s*—; and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*